June 29, 1954

G. F. WALES 2,682,117

APPARATUS AND METHOD FOR INSTRUCTION
THROUGH OPTICAL PROJECTION

Filed June 21, 1950

INVENTOR.
George F. Wales
BY
Edwin B. Gary
Attorney.

June 29, 1954
G. F. WALES
2,682,117
APPARATUS AND METHOD FOR INSTRUCTION
THROUGH OPTICAL PROJECTION
Filed June 21, 1950
2 Sheets-Sheet 2
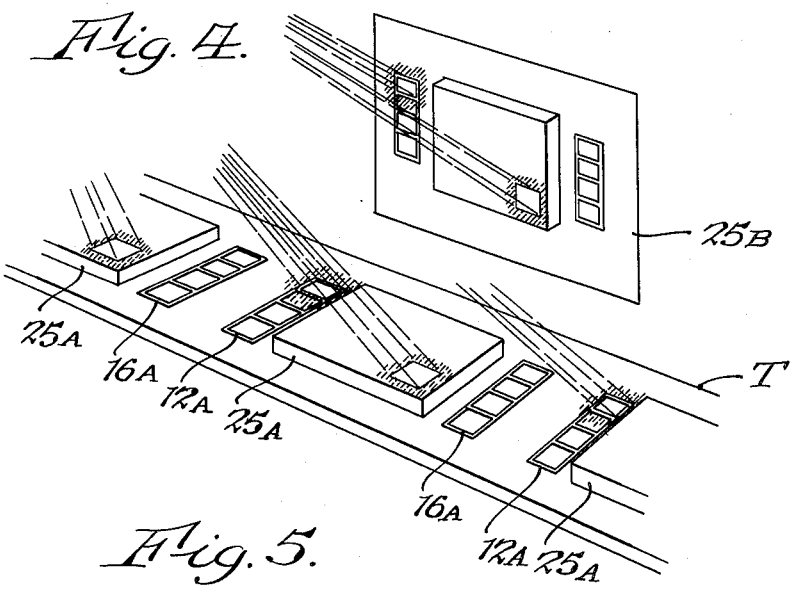
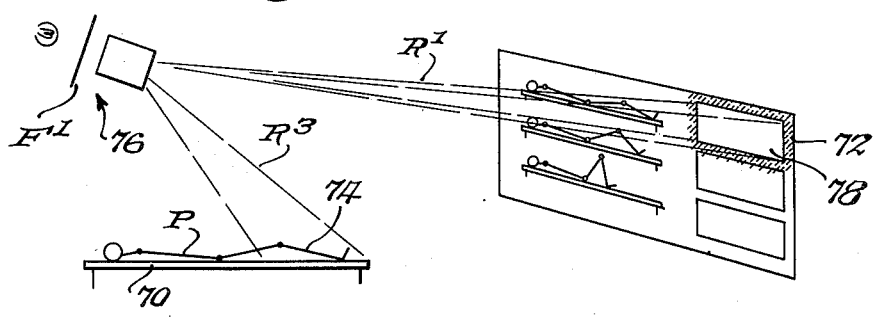
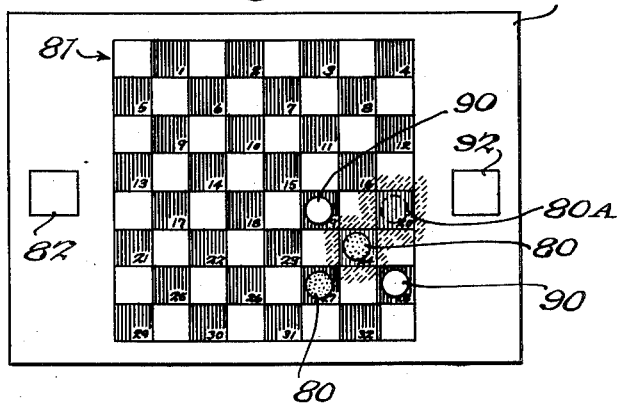
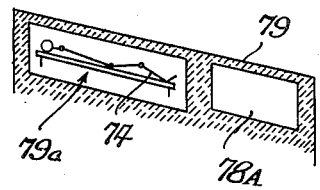
INVENTOR.
George F. Wales
BY
Edwin B. Gary
Attorney.

Patented June 29, 1954

2,682,117

UNITED STATES PATENT OFFICE 2,682,117

APPARATUS AND METHOD FOR INSTRUCTION THROUGH OPTICAL PROJECTION

George F. Wales, Kenmore, N. Y.

Application June 21, 1950, Serial No. 169,420

7 Claims. (Cl. 35—8)

This invention has reference to apparatus for and method of projection and use of light-producing record strips such as transparent film or other light-producing media, carrying recorded data of or with depictions of corelated manual or physical actions.

The invention is particularly suitable for use in training individuals, for example, in industrial establishments by teaching assembly operations, so that the work may be done with the least number of and the most direct motions and the element of fatigue reduced to the end that time and money may be saved.

By means of the existing methods and devices used at present, a given sequence of motions may be determined to be the most efficient for a selected job, and individuals are then trained through oral and written instructions, sometimes supplemented by moving picture projection on a screen. This information must be mentally assimilated to master the required sequence of movements and is costly and time consuming.

However, with my invention training individuals in these and other fields is within the scope of the devices and methods disclosed herein whereby mental assimilation is reduced. For example, in various forms of assembly operations and in rehabilitation, as in the teaching of one who has lost the use of a limb due to accident, or from paralysis, certain cyclic motions of the limb, serially repeated for a selected or desired number of times per period, are urged or required by utilization of light beams and, if desired, depictions of the required actions.

Likewise, in many games of skill, of which the games of chess and checkers are examples, motions or moves in shifting playing pieces may be suggested, and repeated, in order to teach the scientific methods of play.

My present invention relates to novel apparatus and method of use thereof, including an optical projection system, useful in training individuals in acquiring proficiency in manual movements with improved facility and greater dexterity without great mental effort. Films or the like transparencies bearing recorded data in the form of light producing areas and other matter related to the subject, activity or manipulation being taught are projected and used in a novel manner.

The primary object of this invention is to provide means for indicating manual movements by means of contrasts in illumination between areas of work and/or sources of elements related thereto and the physical faculty to be utilized.

A further object of the present invention is the provision of novel apparatus for the projection and reception of light-transmitted images or light beams for visual observation of a trainee, during the performance of the activity being taught.

Another object of the invention is to project areas of light or images from the transparency at a distance from the area of activity to afford greater facility and freedom of the trainee.

A further object is to provide apparatus for projecting and novel means for receiving projected images of photographic records and related data which have previously been developed from time and motion study records of specific activities.

Another object of this invention is the provision of a novel method of using the foregoing for indicating a sequence of motions to be used in a specific activity to aid in improved performance of that activity.

An important object of this invention is to provide means whereby a table, surface or area, upon which the work or activity being taught may progress, may have certain prescribed areas or sections thereof of contrasting illumination to attract attention specifically thereto when activity is required in those areas.

Another object is that of aiding an individual who is receiving instructions or training by spotlighting his hand or hands or other physical faculty when occupying the correct prescribed areas or sequence of positions in co-relation to the progress of activity required at those positions; also to assist the individual to quickly learn how and when to move to and from selected or required positions, or sequentially from one position to another.

Further objects of the invention contemplate means for simultaneously spot-illuminating selected work areas and also other areas wherein items to be transferred from the latter areas to the former for use thereat may be illuminated to enable attention to be directed to such items while being secured for transfer; also to simultaneously illuminate an area and also the hand of the student or trainee during its occupancy of one and then the other of the areas mentioned; and, further, to alternately shift the illumination back and forth from said two areas when desired for repeat performances of the same activities whereby an action may occur a desired number of times.

A further important object is the provision of means for projecting from film or transparencies, selected transparent and opaque areas co-related to the work in hand, so that the successive steps in the series required for that work may be indicated through spot lighting parts of the work area in succession, as by light defined areas or by illuminated images of selected parts of the matter being projected, or by the simultaneous use of both.

Another object of the invention is the production of apparatus of the type described which is readily adaptable for use in widely different or varying activities or operations and in all of which the user will be aided in acquiring improved facility and dexterity.

Other objects and advantages of this novel invention and methods of use thereof will appear as the description which follows proceeds.

In the drawings forming part of the specification of this invention:

Fig. 4 is a diagrammatic illustration of the use of the invention in simultaneously training a group of individuals in the same operations.

Fig. 5 is a diagram suggesting the use of the invention in training a partially incapacitated person in regaining the use of a limb.

Fig. 6 is a fragmentary view illustrating an alternate arrangement of the use of the apparatus in Fig. 5.

Fig. 7 illustrates the use of the invention in acquiring skill in playing a game, such as the game of checkers.

Figure 1:
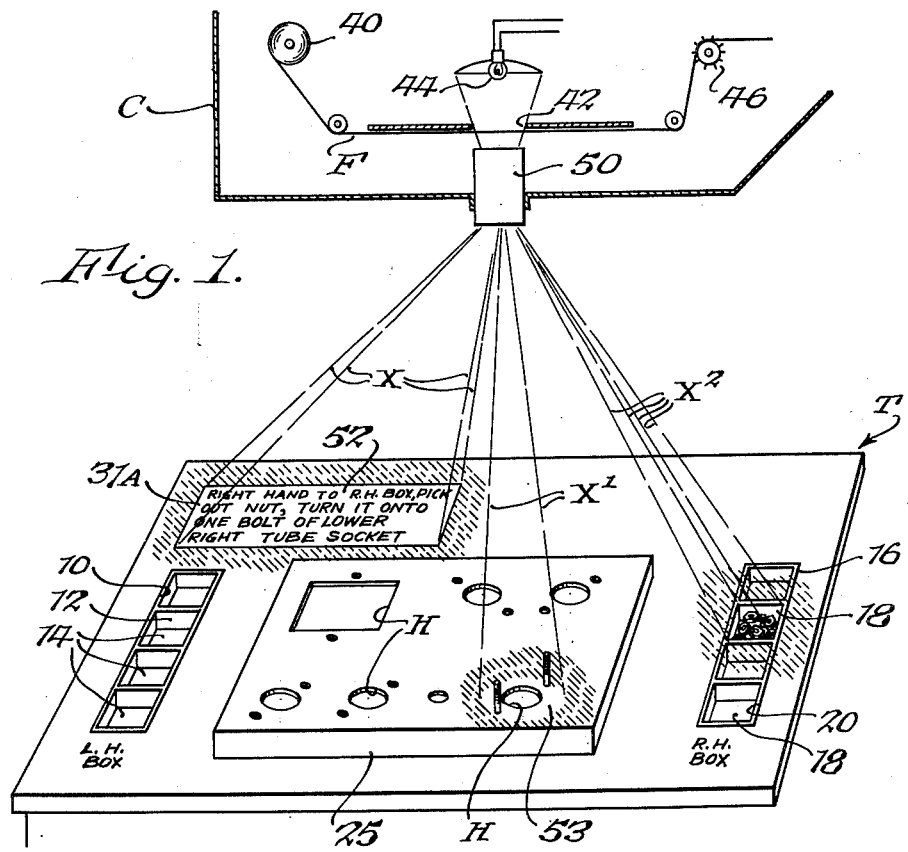
Fig. 1 is a perspective view, partly in section, of one form of the novel apparatus, illustrating its use in teaching an industrial assembly operation.

To illustrate one form of time and motion training in accordance with the novel apparatus and methods of use thereof, as exemplified by this invention, I show in Fig. 1 a table T having at opposite ends suitable facilities for carrying or segregating items or parts to be used during instruction.

For example, set flush in an opening 10 at the left end of the table T may be a box or receptacle 12, divided into compartments 14 by suitable partitions. Here screws, bolts, cotter pins or other needed items may be segregated. Likewise at the right of table T a similar box or receptacle 16, having compartments 18 may be placed flush in an opening 20.

Let it be assumed that the work to be done in the training of individuals in time saving and dexterity is, as in the example shown in Fig. 1, the assembly of certain items on a simple radio chassis. Such a chassis 25 is mounted on table T between the boxes 12 and 16. The chassis 25 has been formed with certain groups of holes H as shown, where component parts (not shown) may eventually be mounted.

Figure 2:
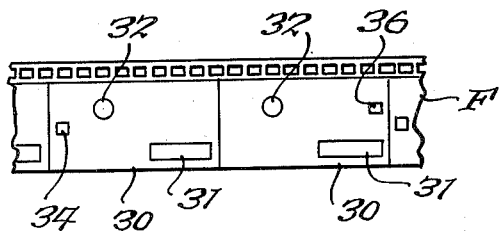
Fig. 2 is a diagrammatic view of a portion of a transparency having thereon instructions or data which may be used in the apparatus of Fig. 1.

In Fig. 2 of the drawings is shown diagrammatically, a section of a strip of film F, transparency, or other type of light-producing record such as may be used in training an individual according to this invention. Such a record may bear various types of subject matter, or blank areas. The successive sections or "frames" 30 thereof, for example, may bear areas 31 carrying wording or sentences giving instructions as to procedure at specific moments, while areas 32 thereof may represent, in the same or repeat locations, or different locations, where a particular action, movement or assembly step is to occur at a particular time. Likewise, the areas 34 and 36 will respectively inform a student where he is to reach for and acquire a particular item for use, as stated in the instructions given at that time at area 31 of section 30.

A film such as film F; Fig. 2, or other light-producing record or transparency, in order to be used in a position spaced from the table T, may be mounted operatively in any suitable projection device adapted to the record being used and indicated generally at C, Fig. 1.

Such devices, whether for projection by reflected or through light per se, are well known and it is deemed unnecessary to show these devices in detail. Suffice it to say that the projection device C, illustrated herein, includes means for supporting the initially wound film F, as at 40, and means for drawing it across an exposure aperture 42, for illumination thereat by a lamp 44. The film should preferably be moved across opening 42 step-by-step or intermittently, in order for the projected images therefrom to come to rest during the desired step-by-step operations at table T. For this purpose a feed wheel 46 may be engaged with film F and its rotation made intermittent by any suitable drive means, such as a motor, not shown. From thence, the used film will be wound up for future use.

Aperture 42 is disposed between the lamp 44 and suitable projection means, as the lens system 50, which, upon being set into proper focus, will project sharp images of subjects or areas on film F or other types of suitable records upon table T.

The use of a record F in the manner described, enables it to carry matter or spaces differing widely in character, depending on the specific need of the matter in hand.

For example, the procedure of using, in this instance, the film F in the apparatus of Fig. 1, may be explained by stating that this view represents the result attained during projection, in projection device C, of the left-hand "frame" or section of the film illustrated in Fig. 2.

The projected image 31A of an area 31, of film F, as carried by light rays X, is seen at space 52 on the work surface T25, which may be a plain white area for good reception. Still referring to the left-hand "frame" or section 30 of film F, Fig. 2, the areas 32 and 34 thereof may be so proportioned and located that, upon passing light therethrough and through lens system 50, as indicated by the rays $X^1$ and $X^2$ respectively, an area on chassis 25 bounding the openings at H, referred to at 53, and likewise a section 18 of box 16, having the required part asked for, will be illuminated, as suggested by the shaded areas in Fig. 1.

As the film is fed through the projection apparatus, a section 30 thereof, such as the next one in Fig. 2, will be in projection position. That frame or section may bear different instructions in area 31, referring perhaps to a nut required from a division 14 of box 12 at the left for application to a standing bolt in area 53, as illustrated. The area 36 of film F will now be positioned to illuminate that division 14 in box 12.

It will be seen that by the use of light-producing records whether of the film or reflecting type and the apparatus as described, certain prescribed areas of the work, such as parts of the chassis 25, and of sections of the boxes 12 and 16 may be spot-lighted or brightly illuminated during progress of the work at those areas. The remaining areas of the parts mentioned will be more or less in subdued or blacked-out condition. In this way, the concentration of attention is instantly directed to the work areas, as needed, without loss of time in searching for the areas or parts referred to from time to time in the instruction area 52. To bring out this feature, shading has been applied to parts surrounding the work area, and the box section in use in Fig. 1. While the remaining areas might also be blacked out at this time, sufficient extraneous light will probably pass through the film to give weak, general illumination of the project. Obviously weak light from another source could be used if found necessary.

It will be apparent that while higher illumination of the work area and work is preferred, the process could be reversed with the work areas and work in darker or contrasting tones of illumination. This alternate procedure might prove desirable for some applications. This effect could also be obtained by utilizing a fluorescing material on the work with a source of illumination in the projection of a type suitable for energizing the work area through apertures in a record passing through the projector. Such apparatus and method is well known and its application to this device is obvious.

In the drawings, Fig. 1 and Fig. 2, illustrating the form of the invention above described, the spot illumination of three areas of the arrangement shown are disclosed without showing the presence of the student or individual being taught.

However, in practice, the hands of an individual at work on the project will also be spot illuminated during such times as they are in the proper selected work areas. In this way aid is given to assure that moves are made in the proper areas at the proper time.

For example, when the instructions at area 52 state that a nut is to be removed from a section 18 and applied to a bolt at socket area 53, the light beams $X^1$ and $X^2$ will not only illuminate areas 53 and 18, but, as a hand moves to pick up a nut at 18 it too will be brightly lighted. Then when the hand moves to apply the nut to the bolt at 53 it will again be lighted up. Thus, should the hand be moved to other than the foregoing areas it will not be so illuminated, thereby warning the individual that he is proceeding other than in the desired fashion.

It will be obvious from the foregoing that distribution of light other than that specifically shown and described may be used to advantage.

For example, instead of having light directed to area 53, as from film area 32 from one after another of the "frames" 30 of film F, light could be transmitted from film areas 32 of several "frames" 30 alternately with light transmission from areas 34 of the "frames" 30 intervening. In this way, by suitable time control, the light beam would pass back and forth from 18 to 53, say four times, during each of which passes, a hand would also move to and fro to obtain and sequentially apply four nuts to the four bolts in area 53 and while so doing, would be alternately illuminated in the respective areas.

The disclosure of the invention, as thus far set forth, shows parts of the table area at 52 to be illuminated and to be receiving lettered instructions. The areas covered by light rays $X^1$ and $X^2$ are illuminated by clear light from the blank areas 32 and 34 of "frame" 30. However, these areas 32 and 34 could bear a representation of the actual work or manipulation to be performed to illustrate to the observer just how he is to proceed.

Alternatively, particularly where flat or blank image receiving areas occur on the chassis 25, or other work piece, the parts to be worked on could be illuminated in full, as before, while an image representing the work there required could be simultaneously projected from the film to fall elsewhere on the chassis 25.

Figure 3:
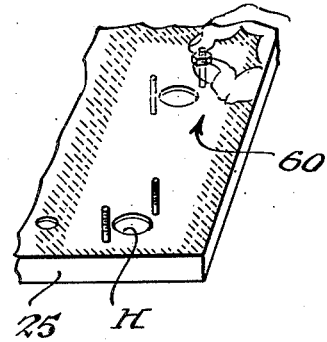
Fig. 3 is a fragmentary perspective view of a variation in the use of a portion of the apparatus shown in Fig. 1.

This variation in arrangement, residing within the scope of the invention, is suggested in Fig. 3. Here the lower right corner of chassis 25 is shown, as in Fig. 1, but while the aperture at H is illuminated as before the area adjacent thereto now is receiving a projected image 60, as of the thumb and first finger of a right hand, applying a nut to one of the bolts of the actual work area H adjacent.

The surroundings of the section thus actively in use, are shaded in the drawings, to accentuate the modified arrangement just described.

In some cases a reversal of the arrangements so far described could be used. For example, a pictorial representation, as in Fig. 3, might be projected directly upon the socket area, in place of the clear light area projected as shown in Fig. 1.

Due to the arrangement of the projection means and the light source at a distance from the work zone, a maximum of freedom of operation is possible during progress of the work, and the specific or local areas of action are pointed up or highlighted to direct attention thereto.

I have thus far described my invention as employing a model or industrial unit mounted on a table, where, when the projected images are produced, they fall directly on or adjacent the work and the work-piece containers. With such an arrangement it may be that only one or two students can receive instruction simultaneously.

However, the invention may be used to give instruction to a number of individuals at the same time. One way to accomplish this is as shown in Fig. 4, wherein a plurality of the radio chassis units 25A or other units together with receptacles 12A and 16A are mounted, as before, on a table or support T. To give simultaneous instruction to the individuals working at the units, I would provide a pictorial representation of one unit of the work, as at 25B on a panel or board placed vertically before the group so that all could observe at once, while individually working on the respective units 25A.

The spaced unit 25B of either type just described would receive projected instructions, under spot lighting as before. In this way, instructions could be given more students with the same use of time as with one student only.

Another valuable use to which this invention may be applied is that of aiding persons to regain for example, the use of a limb which may have been incapacitated, as by an accident, or by paralysis, due to polio, or otherwise. It is desirable for such persons to be urged to sequentially move a limb repeatedly through various motions to endeavor to eventually restore normal use.

The use of the invention for such, and for similar purposes is illustrated in Figs. 5 and 6. In Fig. 5, a person, lying prone is shown diagrammatically at P resting on a bed or support 70. A panel 72 may be positioned adjacent the bed for observation by person P and upon which, as well as upon the leg 74 or other part of the person, light beams may be cast by a projection device 76 from a film or transparency F¹.

Instruction and visual observation by the patient may be obtained, generally as by the procedure and method of Fig. 1. One way to effect the desired result would be to provide on panel 72 a series of printed illustrations showing the desired step by step or sequential motions required see Fig. 5, and to spot illuminate the illustrations as by rays in sequential order. The desired procedure could then be given on the instruction panels 78, either printed thereon, and spot illuminated, or merely cast thereon from sequential areas on the film as by rays R¹.

In either case the instructions will appear in sequence and simultaneously with the showing of the required movements.

During the foregoing activity some or all portions of the leg 74 of the person P may be spot illuminated from the projection means 76, preferably to light up the leg in an order corresponding to the positions in which it is to be moved, and which illumination would correspond to the serial movements called for on the panel 72, see rays R³.

An alternate way to secure the foregoing aid to the person P, would be as shown in Fig. 6, where the panel 79 is without any illustrations. Here the required step by step motions of the leg 74 would be taught by casting upon the panel picture images 79A of the serial movements and the accompanying instructions 78A. The person's leg could, in this case, also be spot illuminated as before, or this step could be dispensed with, if found desirable.

A checker board is indicated at 81 on a panel 83 of Fig. 7 which suggests the use of this invention for assistance in training persons in games of checkers, chess or games of like character.

The black men are represented at 80 while the white men are indicated at 90.

There are shown two panels, one at 82 for receiving instructions for play by the user of the black men, and another at 92, for receiving and imparting instructions for playing the white men.

As indicated by the lighted square, 80A, the black man 80 is to be moved from the full to the dotted line position as shown by the light beams and as stated in the appropriate wording at the time present on panel 82. The next play will be by the player of the white men, and appropriate instructions or comments relative to moving a white man will appear on panel 92.

It will be obvious that, in general the projection means shown in Fig. 1 may be used to suggest movements of the players, as required in the game shown in Fig. 7.

From the foregoing disclosures of various types of this invention, it should be apparent that the novel features and methods of use thereof are adapted to be applied in a practical manner in aiding or training individuals in acquiring dexterity of motion or manipulation with the minimum of lost effort and time.

Furthermore, the training procedures described, and others within the scope of the invention, may be had by direct observation of the projected images or light beams, and without the need of supplementing the training learned thus, by oral instruction or interjection of vocal statements at any time by the person in charge.

As proficiency in the required activities proceeds, the film or transparency may be run through the projection means C at increasing speed to keep up with the acquired speed of the individual.

Having thus described my novel invention and some of its applications, it will be apparent that individuals may be trained by its use in acquiring dexterity in sequential movement.

I claim as my invention:

1. Apparatus for use in visually training individuals in achieving proficiency in repeat or sequential operations, including a panel element having work areas thereon on which operations are to be performed, other areas thereon within which work items for use on said work areas may be disposed, a transparency having thereon images depicting selected work areas of said panel element and of said other areas, a light source, a projection lens spaced from said panel element to project said images on said transparency upon said element, and means for effecting movement of said transparency, said images when projected, being positioned to fall respectively on said selected work areas and upon selected items in other areas to spot illuminate the same during operations on said panel element.

2. Apparatus for use in visually training individuals in achieving proficiency in repeat or sequential operations, including a panel element having work areas thereon upon which operations are to be performed, other areas thereon within which work items for use on said work areas may be disposed, said panel element also having an instruction receiving space adjacent said work areas, a transparency having thereon images depicting selected work areas and said other areas of said panel element and also bearing instructions for projection upon said instruction space, a light source and a projection lens spaced from said panel element to project thereon images from said transparency of selected work areas, selected areas containing said work items, and instructions on said space, and means for effecting movement of said transparency, whereby said areas and said space may be spot illuminated during the performance of operation on said panel element.

3. Apparatus for use in visually training individuals in achieving proficiency in repeat or sequential operations, including a panel element having work areas thereon upon which operations are to be performed, other areas thereon within which work items for use on said work areas may be disposed, a transparency having thereon images depicting selected work areas of said panel element and of said other areas, a light source and a projection lens spaced from said panel element to project said images on said transparency upon said element, said images when projected, being positioned to fall respectively on said selected work areas and upon selected items in said other areas to spot illuminate the same during operations on said panel element, said transparency having sections thereon bearing, in succession, images of different selected groups of work areas and of said other areas of said panel element, and means for intermittently shifting said transparency to enable said different image groups of said work areas and of said other areas to be successively projected upon said panel element to spot illuminate such different areas.

4. Apparatus for use in visually training individuals in achieving proficiency in repeat or sequential operations, including a panel element having work areas thereon upon which operations are to be performed, other areas thereon within which work items for use on said work areas may be disposed, a transparency having thereon images depicting selected work areas of said panel element and of said other areas, a light source and a projection lens spaced from said panel element to project said images on said transparency upon said element, said images when projected, being positioned to fall respectively on said selected work areas and upon selected items in said other areas to spot illuminate the same during operations on said panel element, said transparency having sections thereon bearing, in succession, images of different selected groups of work areas and of said other areas of said panel element, and means for intermittently shifting said transparency to enable said different image groups of said work areas and of said other areas to be successively projected upon said panel element to spot illuminate such different areas, said panel element also having thereon an instruction receiving space, and said transparency also bearing, on successive sections thereof, different sets of instructions positioned to enable the same to be projected on said instruction space of said panel element in co-relation to the aforesaid successive different image group projections.

5. Apparatus of the character described comprising a support having an area for supporting a piece of work and other areas for supporting a plurality of parts which are to be assembled on said work-piece, and means for projecting intelligence upon selected parts of said other areas and upon different areas of the work-piece in a predetermined sequence to indicate to an operator the sequence of the parts which are to be assembled on the work-piece and the areas of the work-piece on which said parts are to be assembled sequentially.

6. Apparatus of the character described comprising a support having an area for supporting a piece of work and other areas for supporting a plurality of parts which are to be assembled on said work-piece, and means for projecting light beams on selected parts of said other areas and on different areas of the work-piece in a predetermined sequence to indicate to an operator the sequence in which the parts are to be assembled on the work-piece and the areas of the work-piece on which said parts are to be assembled sequentially, said projecting means being so disposed with reference to said support that the operator's hand is illuminated as he picks up an illuminated part and as he places a part upon an illuminated area of the work-piece.

7. Apparatus of the character described comprising a support having an area on which a piece of work may be disposed and other areas on which a plurality of parts which are to be assembled on said workpiece may be disposed, and means for spot-illuminating selected parts of said other areas and different areas of the workpiece in a predetermined sequence to indicate to an operator the sequence of the parts which are to be assembled on the workpiece and the areas of the workpiece on which said parts are to be assembled sequentially, said means comprising a plurality of transparencies of uniform size, which have light-transmitting areas related to said parts and other light-transmitting areas related to the different areas of the workpiece, light-projecting means, and means for successively moving said transparencies into registry with said light-projecting means between said light-projecting means and said support, whereby the light passing through the different light-transmitting areas of the transparencies illuminates said parts and the different areas of the workpiece on which the parts are to be assembled.

References Cited in the file of this patent

UNITED STATES PATENTS

| Number | Name | Date |
|---|---|---|
| 1,199,980 | Gilbreth | Oct. 3, 1916 |
| 1,514,823 | Austin | Nov. 11, 1924 |
| 1,532,069 | Oritz | Mar. 31, 1925 |
| 1,804,764 | Grant | May 12, 1931 |
| 2,252,726 | Peck | Aug. 19, 1941 |
| 2,291,152 | Carter | July 28, 1942 |
| 2,301,274 | Greiser | Nov. 10, 1942 |
| 2,357,593 | Leavell | Sept. 5, 1944 |
| 2,402,109 | Williams | June 11, 1946 |
| 2,494,000 | Robertson | Jan. 10, 1950 |
| 2,605,557 | Van Deventer | Aug. 5, 1952 |

FOREIGN PATENTS

| Number | Country | Date |
|---|---|---|
| 7,522 | Great Britain | Mar. 31, 1913 |